United States Patent [19]

Russell et al.

[11] 4,009,666
[45] Mar. 1, 1977

[54] APPARATUS FOR DISTRIBUTING FLUIDS BELOW SOIL SURFACES

[76] Inventors: Jack C. Russell, 2615 Ardsley Drive, Orlando, Fla. 32804; John F. Russell, Blackhawk Drive, Indian Mound Village, Sanford, Fla. 32771

[22] Filed: May 19, 1975

[21] Appl. No.: 578,761

[52] U.S. Cl. .................................. 111/6; 239/159; 239/176; 239/281; 239/287; 239/550; 239/590

[51] Int. Cl.² .................... A01C 23/02; B05B 1/20

[58] Field of Search .......... 239/273, 275, 279–281, 239/285–288.5, 532, 550, 590, 159, 575, 176; 111/6; 47/1.44, 1.43

[56] References Cited

UNITED STATES PATENTS

| 1,568,250 | 1/1926 | Stanton | 239/590 X |
|---|---|---|---|
| 2,369,357 | 2/1945 | Kunz | 239/575 X |
| 2,501,555 | 3/1950 | White | 239/286 |
| 2,518,771 | 8/1950 | Gol | 239/550 X |
| 2,581,678 | 1/1952 | Malin et al. | 239/286 X |
| 2,874,656 | 2/1959 | Bennett | 239/288.5 X |
| 2,988,025 | 6/1961 | Johnston | 111/6 |
| 3,023,970 | 3/1962 | Knoell | 239/176 X |
| 3,061,201 | 10/1962 | Rienecker | 239/281 |
| 3,435,785 | 4/1969 | Harbolt | 111/6 |

Primary Examiner—Evon C. Blunk
Assistant Examiner—Andres Kashnikow
Attorney, Agent, or Firm—Duckworth, Hobby, Orman, Allen & Pettis

[57] ABSTRACT

Apparatus for injecting a fluid below a soil or turf surface includes a handle with a support rod attached thereto, and a plurality of nozzles carried by the support rod, each nozzle forming a stream of fluid passing therethrough. Each nozzle is provided with a skid having a curved surface for low friction contact with the soil or turf surface and for holding the nozzle out of contact with the surface. The apparatus is provided with a pump which cooperates with the nozzle to inject the fluid substantially below the soil surface.

11 Claims, 5 Drawing Figures

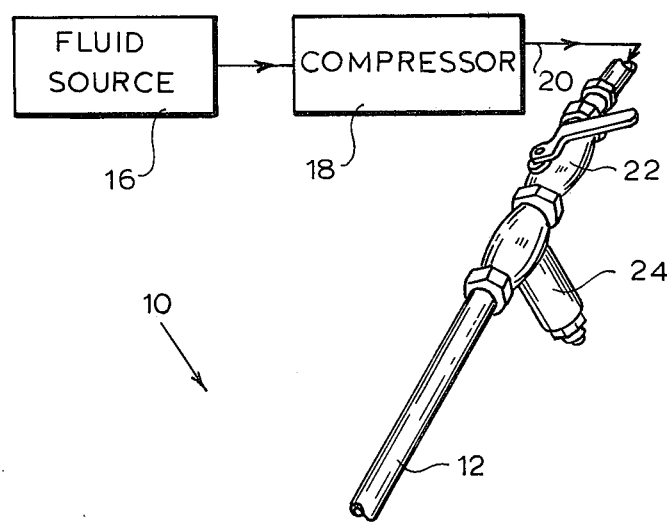
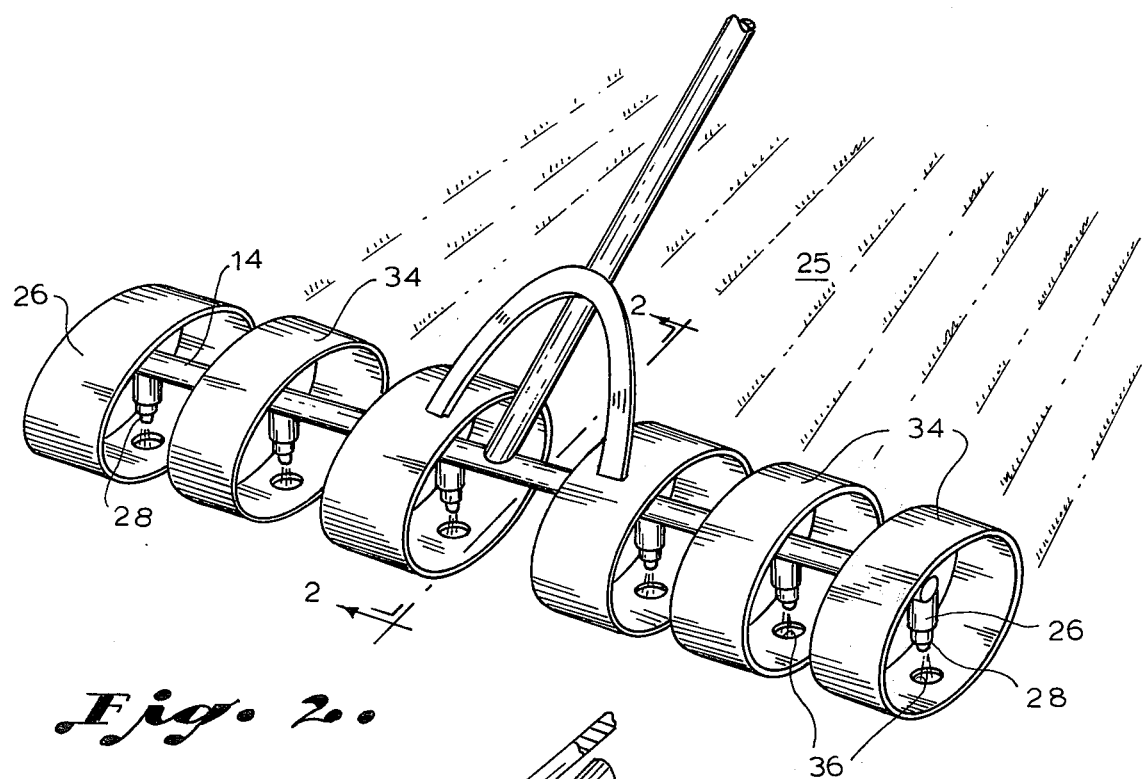
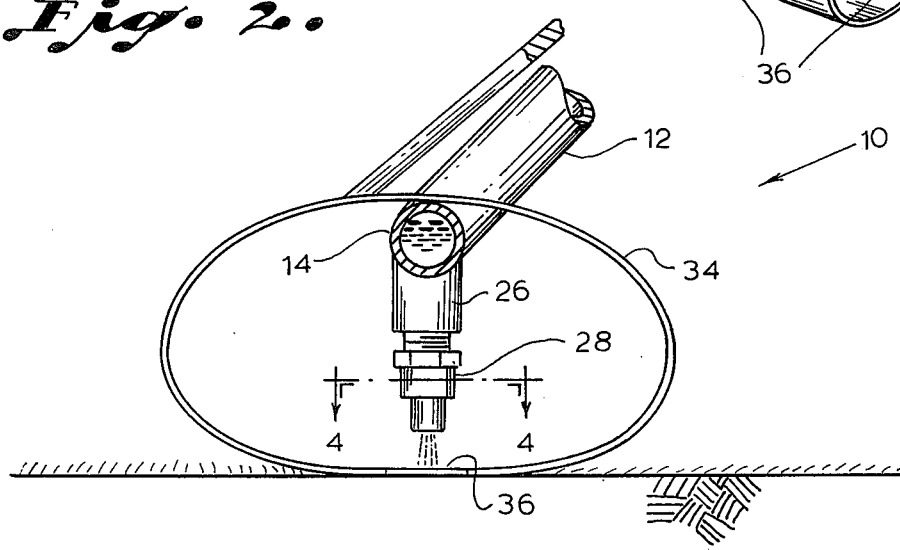

APPARATUS FOR DISTRIBUTING FLUIDS BELOW SOIL SURFACES

BACKGROUND OF THE INVENTION

1. Field of the Invention

The present invention is related to apparatus for distributing materials and fluids below soil or turf surfaces, and in particular is related to such apparatus which is capable of being manipulated by hand.

2. Description of the Prior Art

A variety of prior art devices are disclosed for conditioning the soil by injecting a fluid below the soil surface. For example, Purvance, in U.S. Pat. No. 2,975,735 discloses an agricultural implement for conditioning soil. As disclosed by Purvance, the implement comprises a cylindrical member having hollow spikes extending therefrom, a fluid being pumped through the center of the cylinder and outward through the spikes. In use, the cylinder is rolled across the soil or turf surface, while the weighted cylinder causes the spikes to extend below the surface of the material being treated.

In U.S. Pat. No. 1,979,541, Gunn discloses a hand operated implement having spikes similar to that disclosed by Purvance. Other devices employing means which extend below the surface of the soil are disclosed in the following U.S. Pat. Nos. 1,856,809 to Gibson et al; 2,214,083 to Lester; 3,107,638 to Johnston; 1,871,529 to Karshner; and 3,598,068 to Rosendahl.

SUMMARY OF THE INVENTION

The present invention contemplates apparatus for injecting a fluid below a soil or turf surface comprising a handle member and a support rod extending substantially normal to the handle member, with a plurality of nozzles carried by the support rod, each nozzle capable of forming a stream of fluid passing therethrough. Means having a curved surface for low friction contact with the soil surface and for engaging the soil or turf surface to hold the nozzles out of contact with the soil or turf surface are provided. Further means are provided for pumping the fluid through the nozzles under pressure, the pumping means and the nozzles cooperating to inject the fluid substantially below the soil surface.

In one embodiment, means are further provided for allowing variations of the angle between the skids and the support rod, such that the apparatus may be employed with soil surfaces having crop rows and mounds.

In a preferred embodiment, each nozzle is provided with a baffle to ensure that the fluid flow therefrom is relatively narrow, and by utilizing the pressure delivered by the pump, is capable of being injected substantially below the soil or turf surface.

THE DRAWINGS

FIG. 1 is a perspective view, partially cutaway, illustrating one embodiment of the present invention.

FIG. 2 is a cross-section of a portion of the apparatus shown in FIG. 1, taken along the lines 2—2.

DETAILED DESCRIPTION

Figure 3:
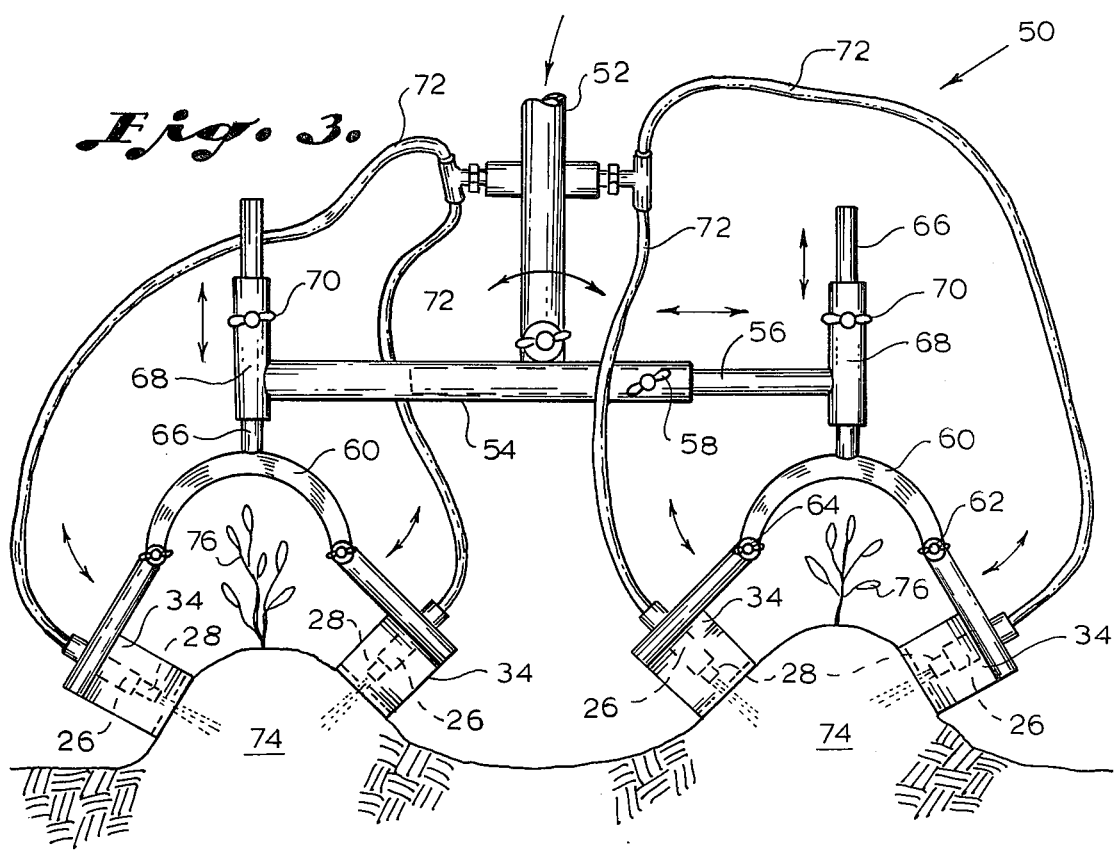
FIG. 3 is a front view of apparatus in accordance with a second embodiment of the present invention, with a portion of the apparatus cutaway.

A first embodiment of apparatus in accordance with the present invention will now be described with reference to FIGS. 1, 2 and 4.

The apparatus, referred to generally as 10, includes a handle member 12, preferably comprising a hollow tube. The various materials used in the construction of the apparatus 10 are not essential, but preferably comprise metals of relatively high tensile strength, and which are resistant to corrosive chemical mixtures.

A support rod 14 is joined transverse to the hollow handle member 12, the support rod also having a hollow interior which communicates with the interior of the hollow handle member 12.

A source of fluid 16 and a compressor 18 are associated with the apparatus 10, and are joined thereto by a hose 20. The apparatus 10 is further provided with a valve 22 of conventional design which may be operated to intermittently interdict the flow of fluid into the handle 12. A filter 24 of conventional design is positioned between the valve 22 and the support rod to remove solid and foreign substances from the fluid passing therethrough.

The apparatus 10 is further provided with a plurality of nozzle assemblies which extend substantially perpendicular to the support rod 14 and which are adapted to extend substantially perpendicular to the soil or turf surface 25 being treated. Each nozzle assembly includes a threaded fitting 26 joined to the support rod 14, and a nozzle 28 fastened to the fitting 26.

Figure 4:
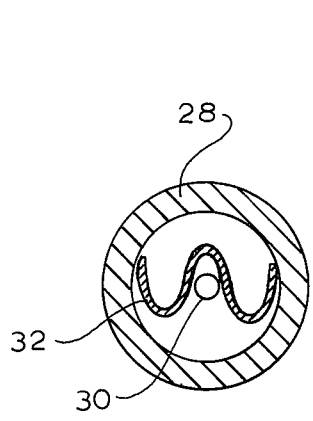
FIG. 4 is a cross-section of a portion of the apparatus shown in FIG. 2, taken along the line 4—4.
Figure 5:
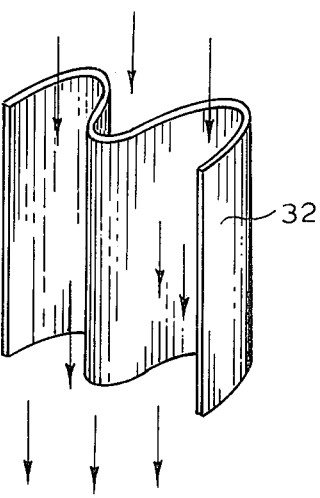
FIG. 5 is a perspective view of a portion of the apparatus shown in FIG. 4.

Referring now to FIGS. 4 and 5, the nozzle 28 includes an exit aperture 30 at the bottom thereof, and a baffle 32 positioned within the nozzle to effect alignment of the fluid flowing through the nozzle such that the stream of fluid exiting the aperture 30 constitutes a relatively narrow stream. While the baffle 32 may comprise a variety of conventional designs, a specific circuitous baffle arrangement is shown in FIG. 5, the direction of fluid flow being illustrated by arrows.

Reference is again made to FIGS. 1 and 2. A skid 34 is associated with each nozzle 28, for providing low friction contact between the apparatus 10 and the soil or turf surface 25, and for holding the corresponding nozzle 28 out of contact with the soil or turf surface. In this embodiment, each skid has an elliptical cross-section, with the axes of the ellipse extending substantially parallel with the support rod 14. While specific oval-shaped skids 34 are shown in FIGS. 1 and 2, it will be appreciated by those skilled in the art that other curved surfaces defining an elliptical arrangement satisfies the requirements for providing a low friction contact with the soil surface 25; for example, the skids having circular cross-sections might be suitable for certain applications, and provide an elliptical section wherein both axes of the ellipse constitute the same axis. Each skid 34 is provided with an aperture 36 axial with the exit aperture 30 of the corresponding nozzle 28.

In use, the apparatus 10 is attached to the fluid source 16 through the compressor 18 via the hosing 20, and is moved along the soil or turf surface 25 if the valve 22 is in the open position. The fluid is pumped under pressure through the handle 12, the support rod 14, the threaded fitting 26 and into all of the nozzles 28. Skids 34 allow the apparatus 10 to be hauled along the soil or turf surface 25, while the fluid stream exits the nozzle 28 through the skid apertures 36. During this operation, the skid 34 serves as a splash guard for the highly pressurized fluid flowing through the nozzles 28.

A second embodiment of the apparatus in accordance with the present invention is shown in FIG. 3 and is described with reference thereto. The apparatus, referred to generally as 50, is adapted for use with crops and plants which grow in rows or mounds, such that fertilizers, fungicides, pesticides and other liquid soil conditioners may be injected into the soil near the base of the plant.

Referring to FIG. 3, the apparatus 50 includes a handle 52 and a support rod, comprising a hollow tube 54 and a telescoping rod 56 with a locking thumb screw 58 for allowing the overall length of the support rod to be adjusted.

The apparatus 50 includes a nozzle and skid arrangement identical to that of FIG. 1 and referred to with the same reference numerals, including the threaded fitting 26, the nozzle 28 and the skid 34. In this embodiment, the skids 34 are carried by struts 60 by attachment of each skid 34 at a pivot point 62 with a locking screw 64.

Each strut 60 is joined to a vertical rod 66, which extends through a vertical tube 68 and is held therein by a locking screw 70 or equivalent fastening means. A hose 72 is coupled between the hollow handle 52 and each fitting 26, to allow the fluid passing through the handle to be directly communicated to all of the nozzles 28.

In use, the apparatus 50 may be moved along the soil surface being treated with the skids 34 angled at a dimension corresponding to the slope of the rows or mounds 74 associated with the crop 76. In this way, the treating fluid may be injected directly into the root structure of the crop 76.

The apparatus in accordance with the present invention allows the injection of soil treating fluids substantially below a soil or turf surface without requiring a tool or nozzle to be injected into the soil, or through the turf. Further, while most high pressure injection systems wherein the nozzle is spaced from the surface cause unsitely holes in the surface, the cooperation between the skid 34, the skid aperture 36 and the nozzle 28 prevent such disturbance to the soil surface, while providing injection of the fluid substantially below the surface in the desired manner.

We claim:

1. Apparatus for injecting a fluid below a soil surface comprising:
    an oblong hollow tube member;
    a hollow support rod extending substantially normal to said tube member;
    a plurality of nozzles carried by said support rod, each said nozzle capable of forming a stream of said fluid passing therethrough;
    said tube member communicating with said rod and said rod communicating with all of said nozzles;
    a plurality of spaced, individual skids of generally elliptical cross-section, each positioned adjacent one of said nozzles for providing a low friction contact with said soil surface and for engaging said soil surface to hold said nozzles out of contact with said soil surface, each skid having an aperture therethrough axial with the corresponding one of said nozzles;
    means for pumping fluid through said nozzle under pressure; and wherein
    said pumping means and said nozzles cooperate to inject said fluid substantially below said soil surface.

2. The apparatus recited in claim 1 wherein the major and minor axis of all of said skids lie in a plane which is transverse to said support rod.

3. The apparatus recited in claim 1 wherein each said nozzle includes means for defining a relatively narrow fluid stream therefrom, said stream having a cross-sectional dimension not greater than the cross-sectional dimension of the aperture of said nozzle so as to facilitate injection of said fluid below said soil surface.

4. The apparatus recited in claim 3 wherein said fluid stream defining means comprises a baffle within said nozzle.

5. The apparatus recited in claim 4 wherein said baffle comprises an oblong member in each said nozzle and extending substantially parallel with the direction of fluid flow.

6. The apparatus recited in claim 5 further comprising a valve along said tube for controlling flow of fluid therethrough.

7. The apparatus recited in claim 6 further comprising a filter positioned between said valve and said support rod for removing foreign substances from said fluid.

8. The apparatus recited in claim 1 further comprising means for adjusting the angle between the axes of said skids and said support rod.

9. The apparatus recited in claim 8 wherein said adjusting means comprises:
    a strut carrying each said skid, each pivotably joined to the corresponding strut; and
    means for locking each skid in a desired position with respect to the corresponding strut.

10. The apparatus recited in claim 9 further comprising means for adjusting the length of said support rod.

11. The apparatus recited in claim 10 further comprising means for adjusting the dimension between said support rod and each said strut.

* * * * *